United States Patent
Onuma et al.

(10) Patent No.: US 10,926,683 B2
(45) Date of Patent: Feb. 23, 2021

(54) CONVEYANCE SEAT

(71) Applicants: TS TECH CO., LTD., Saitama (JP); HONDA MOTOR CO., LTD., Tokyo (JP); LEGGETT & PLATT CANADA CO., Halifax (CA)

(72) Inventors: Koji Onuma, Tochigi (JP); Ryuhei Abe, Tochigi (JP); Taiji Misono, Saitama (JP); Toshimitsu Mizukoshi, Saitama (JP); Masaki Shimazu, Saitama (JP); Akira Nakajima, Saitama (JP); Yuki Fukuda, Saitama (JP); Hiromitsu Nagatomo, Saitama (JP); Rob Colja, Halifax (CA)

(73) Assignees: TS TECH CO., LTD., Saitama (JP); HONDA MOTOR CO., LTD., Tokyo (JP); LEGGETT & PLATT CANADA CO., Halifax (CA)

(*) Notice: Subject to any disclaimer, the term of this patent is extended or adjusted under 35 U.S.C. 154(b) by 19 days.

(21) Appl. No.: 16/381,339

(22) Filed: Apr. 11, 2019

(65) Prior Publication Data

US 2019/0315255 A1    Oct. 17, 2019

(30) Foreign Application Priority Data

Apr. 12, 2018 (JP) ............................. JP2018-077110
Apr. 12, 2018 (JP) ............................. JP2018-077111

(51) Int. Cl.
*A47C 3/00*    (2006.01)
*B60N 2/66*    (2006.01)
*B60N 2/68*    (2006.01)

(52) U.S. Cl.
CPC ............... *B60N 2/667* (2015.04); *B60N 2/68* (2013.01)

(58) Field of Classification Search
CPC .......... B60N 2/68; B60N 2/7052; B60N 2/72; B60N 2/7094
(Continued)

(56) References Cited

U.S. PATENT DOCUMENTS 4,065,182 A * 12/1977 Braniff ................. B60N 2/5825
                                                    297/440.22
5,906,416 A *  5/1999 Rasmussen .............. A47C 7/40
                                                    297/284.3
(Continued)

FOREIGN PATENT DOCUMENTS

JP    2010-173353 A    8/2010

*Primary Examiner* — Chi Q Nguyen
(74) *Attorney, Agent, or Firm* — Michael Best & Friedrich LLP

(57) ABSTRACT

To secure both flexibility and rigidity of a pressure-receiving member, a pressure-receiving member capable of moving rearward in a state of receiving a load from a back of an occupant is included in a seat back of a conveyance seat for supporting the back of the occupant. The pressure-receiving member has a load-receiving portion which receives the load from the back of the occupant at a front face, and the load-receiving portion includes a load-receiving portion piece formed so that a length in a vertical direction of the seat back is shorter than a length in a seat width direction, and a rear reinforcement rib protruding along a thickness direction of the load-receiving portion from the load-receiving portion piece and extending along the seat width direction.

19 Claims, 9 Drawing Sheets

(58) Field of Classification Search
USPC .............. 297/284.4, 284.1, 284.9, 284.7
See application file for complete search history.

(56) References Cited

U.S. PATENT DOCUMENTS

| | | | | |
|---|---|---|---|---|
| 5,934,752 A * | 8/1999 | Klingler | ................ | A47C 7/462 |
| | | | | 297/284.1 |
| 6,296,308 B1 * | 10/2001 | Cosentino | ............. | A47C 7/465 |
| | | | | 297/284.4 |
| 6,334,651 B1 * | 1/2002 | Duan | ................... | B60N 2/667 |
| | | | | 297/284.4 |
| 6,520,580 B1 * | 2/2003 | Hong | .................... | B60N 2/933 |
| | | | | 297/284.4 |
| 6,676,214 B2 * | 1/2004 | McMillen | ............... | B60N 2/80 |
| | | | | 297/284.1 |
| 6,955,399 B2 * | 10/2005 | Hong | .................... | B60N 2/666 |
| | | | | 297/284.4 |
| 7,120,984 B2 * | 10/2006 | Rutsch | ............. | B29C 45/14221 |
| | | | | 29/527.1 |
| 7,775,603 B2 * | 8/2010 | Mundell | .............. | B60N 2/7052 |
| | | | | 297/452.52 |
| 7,896,438 B2 * | 3/2011 | Whelan | .................. | A47C 7/405 |
| | | | | 297/284.4 |
| 8,011,729 B2 * | 9/2011 | Petzel | ................. | B60N 2/5657 |
| | | | | 297/284.6 |
| 9,278,634 B2 * | 3/2016 | Mathews | ............... | B60N 2/643 |
| 10,406,952 B2 * | 9/2019 | Otake | ................. | B60N 2/6673 |
| 2003/0085599 A1 * | 5/2003 | McMillen | ........... | B60N 2/0232 |
| | | | | 297/284.4 |
| 2005/0173957 A1 * | 8/2005 | Schwarzbich | ........... | B60N 2/66 |
| | | | | 297/284.4 |
| 2010/0096896 A1 * | 4/2010 | Nonomiya | ........... | B60N 2/2356 |
| | | | | 297/362 |
| 2010/0187874 A1 | 7/2010 | Matsui | | |
| 2011/0241403 A1 * | 10/2011 | Yamaguchi | .......... | B60N 2/4228 |
| | | | | 297/452.31 |

* cited by examiner

FRONT ←→ REAR

CONVEYANCE SEAT

CROSS REFERENCE TO RELATED APPLICATIONS

This application is based upon and claims the benefit of priority from prior Japanese Patent Application No. 2018-077110, filed on Apr. 12, 2018, and Japanese Patent Application No. 2018-077111, filed on Apr. 12, 2018, the entire contents of which are incorporated herein by reference.

BACKGROUND OF THE INVENTION

Field of the Invention

The present invention relates to a conveyance seat, and more particularly, to a conveyance seat in which a pressure-receiving member capable of moving rearward in a state of receiving a load from a back of an occupant is included in a seat back.

Description of the Related Art

In the conveyance seat, there is a seat in which the pressure-receiving member capable of moving rearward in the state of receiving the load from the back of the occupant is included in the seat back. The pressure-receiving member receives the rearward load from the back of the occupant and moves (displaces) rearward at the time of rear face collision of the conveyance (for example, a vehicle). By such movement of the pressure-receiving member, the load (impact load) applied to the occupant at the time of collision can be reduced.

On the other hand, in the aforementioned pressure-receiving member, a shape and the like are improved to effectively receive the load that is input from the back of the occupant. More specifically, for example, a pressure-receiving member ("a back rest panel" in Japanese Patent Laid-Open No. 2010-173353) provided in a seat back of a vehicle seat described in Japanese Patent Laid-Open No. 2010-173353 has a shape in which a portion with a large horizontal width (a wide portion) and a portion with a short horizontal width (a narrow portion) are alternately arranged in the vertical direction. With such a configuration, since the horizontal width of the narrow portion is shorter than the horizontal width of the wide portion, the weight of the pressure-receiving member can be reduced. In addition, in the pressure-receiving member having the structure in which the wide portion and the narrow portion are alternately arranged, the side end portions thereof are easily bent, and as a result, when supporting the back of the occupant, the pressure-receiving member easily fits (follows) the occupant's back.

However, in the configuration of the pressure-receiving member described in Japanese Patent Laid-Open No. 2010-173353, a side end portion of the portion having the longer horizontal width (that is, the wide portion) is easily bent, but there is a concern of a decrease in rigidity of the side end portion.

The present invention has been made in view of the above problems, and an object of the present invention is to provide a conveyance seat capable of ensuring flexibility and rigidity of the pressure-receiving member.

SUMMARY OF THE INVENTION

According to the conveyance seat of the present invention, the above object is achieved by a conveyance seat including a seat back for supporting a back of an occupant, wherein the seat back is provided with a pressure-receiving member capable of moving rearward in a state of receiving a load from the back of the occupant, the pressure-receiving member has a load-receiving portion which receives the load from the back of the occupant at a front face, and the load-receiving portion includes a load-receiving portion piece formed so that a length in a vertical direction of the seat back is shorter than a length in a width direction of the conveyance seat, and a reinforcement portion protruding along a thickness direction of the load-receiving portion from the load-receiving portion piece and extending along the width direction.

In the conveyance seat configured as described above, a horizontally elongated load-receiving portion piece is provided in the load-receiving portion of the pressure-receiving member. Further, the load-receiving portion piece is provided with a reinforcement portion protruding from the load-receiving portion piece and extending along the seat width direction. This makes it possible to improve the rigidity of the load-receiving portion piece by the reinforcement portion, while ensuring the flexibility at the load-receiving portion piece.

Further, in a preferable configuration for the above-described conveyance seat, the reinforcement portion may be a rear reinforcement rib provided on a rear face of the load-receiving portion piece.

In the above configuration, since the reinforcement portion is provided on the rear face of the load-receiving portion piece (that is, the surface opposite to the side on which the load from the back of the occupant is received), it is possible to suppress the influence of the reinforcement portion on the riding comfort of the seat, while exhibiting the reinforcing effect by the reinforcement portion.

In addition, in a preferable configuration for the above-described conveyance seat, the reinforcement portion may be provided at a central portion of the load-receiving portion piece in the vertical direction.

In the above configuration, since the reinforcement portion is provided at the central portion of the load-receiving portion piece in the vertical direction of the seat, it is possible to improve the rigidity of the load-receiving portion piece in the vertical direction of the seat in a balanced manner.

In addition, in a preferable configuration for the above-described conveyance seat, the load-receiving portion piece may be provided with a groove-shaped concave portion formed by being recessed rearward, and the reinforcement portion may be provided in a portion raised most rearward in a portion in which the groove-shaped concave portion is provided, on the rear face of the load-receiving portion piece.

In the above-described configuration, the reinforcement portion is provided in a portion raised most rearward in a portion in which the groove-shaped concave portion is provided, on the rear face of the load-receiving portion piece. With such a configuration, when the portion of the load-receiving portion piece provided with the groove-shaped concave portion is bent, it is possible to prevent the deflection deformation from being hindered by the reinforcement portion.

In addition, in a preferable configuration for the above-described conveyance seat, the load-receiving portion piece may be provided with an intersecting reinforcement portion disposed at a position different from the reinforcement portion and intersecting the reinforcement portion, and the intersecting reinforcement portion may protrude in the thickness direction of the load-receiving portion and extend along the vertical direction.

In the above configuration, the reinforcement portion and the intersecting reinforcement portion are further provided on the load-receiving portion piece. This makes it possible to further improve the rigidity of the load-receiving portion piece.

In addition, in a preferable configuration for the above-described conveyance seat, a protruding amount of the reinforcement portion may be larger than a protruding amount of the intersecting reinforcement portion.

In the above configuration, since the protruding amount of the reinforcement portion is larger than the protruding amount of the intersecting reinforcement portion, it is possible to more effectively exhibit the reinforcing effect of the reinforcement portion (that is, strengthening of the rigidity in the seat width direction).

Further, in a preferable configuration for the above-described conveyance seat, the seat back may include a seat back frame, the pressure-receiving member may have an attachment portion for attaching the load-receiving portion to the seat back frame, the attachment portion may include a lower attachment portion connected to a lower portion of the seat back frame, and the reinforcement portion may be disposed to approach a position at which the lower attachment portion is provided in the width direction.

In the above configuration, the reinforcement portion is disposed so that the reinforcement portion approaches a position at which the lower attachment portion is provided in the attachment portion for attaching the load-receiving portion to the seat back frame. With such a configuration, the support performance of the load-receiving portion due to the lower attachment portion is improved, and as a result, the load-receiving portion can be appropriately attached to the seat back frame.

Further, in a preferable configuration for the above-described conveyance seat, the seat back may include a seat back frame, the pressure-receiving member may have an attachment portion for attaching the load-receiving portion to the seat back frame, the attachment portion may include an upper attachment portion connected to an upper portion of the seat back frame, and the reinforcement portion may be disposed at a position deviated from a position at which the upper attachment portion is provided in the width direction.

In the above configuration, the reinforcement portion is provided at a position deviated from the upper attachment portion in the attachment portion for attaching the load-receiving portion to the seat back frame. This makes it possible to improve the rigidity of the load-receiving portion piece, without disturbing the deformation (deflection) of the upper attachment portion so that the pressure-receiving member moves rearward at the time of rear face collision of the conveyance.

In addition, in a preferable configuration for the above-described conveyance seat, the protruding amount of the reinforcement portion may be larger than a depth of the groove-shaped concave portion.

In the above configuration, since the protruding amount of the reinforcement portion is larger than the depth of the groove-shaped concave portion, the reinforcing effect due to the reinforcement portion can be more effectively exhibited.

In addition, in a preferable configuration for the above-described conveyance seat, a plurality of load-receiving portion pieces may be provided at intervals in the vertical direction, the plurality of load-receiving portion pieces may have a first load-receiving portion piece, and a second load-receiving portion piece shorter than the first load-receiving portion piece in the width direction, and each of both ends of the reinforcement portion in the width direction may be located outside the second load-receiving portion piece in the width direction.

In the above configuration, both ends of the reinforcement portion in the seat width direction are located more on the outer side in the seat width direction than the second load-receiving portion piece. That is, the length of the reinforcement portion in the seat width direction is longer than the length of the second load-receiving portion piece. As a result, the reinforcing effect due to the reinforcement portion is more effectively exhibited.

Further, according to the present invention, the above object is achieved by a conveyance seat including a seat back for supporting a back of an occupant, wherein the seat back is provided with a pressure-receiving member capable of moving rearward in a state of receiving a load from the back of the occupant, the pressure-receiving member has a load-receiving portion for receiving the load from the back of the occupant, and the load-receiving portion includes a load-receiving portion piece formed so that a length in a vertical direction of the seat back is shorter than a length in a width direction of the conveyance seat, and a reinforcement portion protruding from the load-receiving portion piece along a thickness direction of the load-receiving portion and extending along the vertical direction.

In the conveyance seat configured as described above, the horizontally elongated load-receiving portion piece is provided in the load-receiving portion of the pressure-receiving member. Further, the load-receiving portion piece is provided with a reinforcement portion protruding from the load-receiving portion piece and extending along the vertical direction of the seat back. This makes it possible to improve the rigidity of the load-receiving portion piece by the reinforcement portion, while ensuring the flexibility at the load-receiving portion piece.

Further, in a preferable configuration for the above-described conveyance seat, the reinforcement portion may be a plurality of front reinforcement ribs disposed so as to be aligned along the width direction.

In the above configuration, since the plurality of reinforcement portions is disposed along the seat width direction, it is possible to further improve the rigidity of the load-receiving portion piece.

In addition, in a preferable configuration for the above-described conveyance seat, the load-receiving portion piece may be provided with a groove-shaped concave portion formed by being recessed rearward, and the reinforcement portion may be located in the groove-shaped concave portion.

In the above configuration, since the reinforcement portion is accommodated in the groove-shaped concave portion, it is possible to further downsize the pressure-receiving member as compared with a configuration in which the reinforcement portion is provided outside the groove-shaped concave portion.

Further, in a more preferable configuration for the above-described conveyance seat, a surface of the load-receiving portion piece located at an opening peripheral edge of the groove-shaped concave portion, and an end of the reinforcement portion in a protruding direction of the reinforcement portion may be located at the same position in the thickness direction.

In the above configuration, the surface located at the opening peripheral edge of the groove-shaped concave portion and the tip of the reinforcement portion are at the same position in the thickness direction of the load-receiving portion. With such a configuration, since the reinforcement portion is completely accommodated in the groove-shaped concave portion, it is possible to further downsize the pressure-receiving member.

Further, in a preferable configuration for the above-described conveyance seat, the seat back may include a seat back frame, the pressure-receiving member may have an attachment portion for attaching the load-receiving portion to the seat back frame, the attachment portion may have a vertical extending portion extending along the vertical direction, and a plurality of reinforcement portions may be disposed so that the vertical extending portion is located between the reinforcement portions in the width direction.

In the above configuration, the attachment portion for attaching the load-receiving portion to the seat back frame has the vertical extending portion, and the reinforcement portions are provided at both side positions of the vertical extending portion. Therefore, the support performance of the load-receiving portion by the vertical extending portion is improved, and as a result, the load-receiving portion can be appropriately attached to the seat back frame.

In addition, in a preferable configuration for the above-described conveyance seat, each of both end portions of the load-receiving portion piece in the width direction may be bent such that a portion of each both end portion located outside in the width direction is located forward of a portion located inside, and the reinforcement portion may be disposed at a position apart from each bent portion of both end portions of the load-receiving portion piece in the width direction.

In the above configuration, each of both end portions of the load-receiving portion piece is configured to be bendable, and the reinforcement portion is disposed at a position away from the bent portion. Therefore, it is possible to improve the rigidity of the load-receiving portion piece, without disturbing the bending of the both end portions of the load-receiving portion piece.

Also, in a preferable configuration for the above-described conveyance seat, a plurality of load-receiving portion pieces may be provided at intervals in the vertical direction, a plurality of reinforcement portions may be disposed on each of the plurality of load-receiving portion pieces, and each of the plurality of reinforcement portions provided on one load-receiving portion piece among the two load-receiving portion pieces adjacent to each other in the vertical direction, and each of the plurality of reinforcement portions provided on the other load-receiving portion piece may be disposed so as to be aligned at the same position in the width direction.

In the above configuration, each reinforcement portion provided on one load-receiving portion piece among the two load-receiving portion pieces adjacent to each other in the vertical direction, and each reinforcement portion provided on the other load-receiving portion piece are disposed so as to be aligned at the same position in the seat width direction. That is, the position at which the reinforcement portion is disposed in each load-receiving portion piece (a position in the seat width direction) is aligned between the load-receiving portion pieces. With such a configuration, as compared with a case where the position of the reinforcement portion deviates between the load-receiving portion pieces, it is possible to further improve the seat feeling that the occupant feels when seated on the seat.

Further, in a preferable configuration for the above-described conveyance seat, the seat back may include a seat back frame, the pressure-receiving member may have an attachment portion for attaching the load-receiving portion to the seat back frame, the attachment portion may include a lower attachment portion connected to a lower portion of the seat back frame, and the reinforcement portion may be disposed at a position at which the lower attachment portion is provided in the width direction.

In the above configuration, the reinforcement portion is disposed in the attachment portion for attaching the load-receiving portion to the seat back frame, at a position at which the lower attachment portion is provided. With such a configuration, the support performance of the load-receiving portion due to the lower attachment portion is improved, and as a result, the load-receiving portion can be appropriately attached to the seat back frame.

Further, in a preferable configuration for the above-described conveyance seat, a plurality of load-receiving portion pieces may be provided at intervals in the vertical direction, the load-receiving portion may include a connecting portion for connecting the load-receiving portion pieces in the vertical direction, and the reinforcement portion may be disposed within a range in which the connecting portion is provided in the width direction.

In the above-described configuration, the reinforcement portion is disposed within a range in which the connecting portion for connecting the load-receiving portion pieces to each other is provided. With such a configuration, the rigidity of the portion provided at the same position in the load-receiving portion as the connecting portion in the seat width direction is improved, and the connecting portion appropriately connects the load-receiving portion pieces to each other.

In addition, in a preferable configuration for the above-described conveyance seat, the load-receiving portion may be constituted by a plate-shaped member, and the reinforcement portion may be made of the same material as a portion of the plate-shaped member other than the reinforcement portion, and may be formed so as to be integrated with the portion other than the reinforcement portion.

In the above configuration, the reinforcement portion is made of the same material as the portion of the plate-shaped member other than the reinforcement portion, and is integrally formed with the portion other than the reinforcement portion. With such a configuration, it is possible to make the load-receiving portion provided with the reinforcement portion have a simpler configuration.

According to the conveyance seat of the present invention, it is possible to improve the rigidity of the load-receiving portion piece by the reinforcement portion, while ensuring the flexibility at the load-receiving portion piece.

Further, according to the conveyance seat of the present invention, since the reinforcement portion is provided on the rear face of the load-receiving portion piece, it is possible to suppress the influence of the reinforcement portion on the riding comfort of the seat, while exhibiting the reinforcing effect by the reinforcement portion.

Further, according to the conveyance seat of the present invention, it is possible to further improve the rigidity of the load-receiving portion piece in the vertical direction of the seat in a well-balanced manner.

Further, according to the conveyance seat of the present invention, when the portion of the load-receiving portion piece provided with the groove-shaped concave portion is bent, it is possible to prevent the deflection deformation from being hindered by the reinforcement portion.

Further, according to the conveyance seat of the present invention, since the reinforcement portion and the intersecting reinforcement portion are further provided on the load-receiving portion piece, it is possible to further improve the rigidity of the load-receiving portion piece.

Further, according to the conveyance seat of the present invention, since the protruding amount of the reinforcement portion is larger than the protruding amount of the intersecting reinforcement portion, it is possible to more effectively exhibit the reinforcing effect of the reinforcement portion.

In addition, according to the conveyance seat of the present invention, the support performance of the load-receiving portion is improved with respect to the lower attachment portion of the attachment portion for attaching the load-receiving portion to the seat back frame, and as a result, the load-receiving portion is appropriately attached to the seat back frame.

Further, according to the conveyance seat of the present invention, when the rear face collision of the conveyance occurs and the pressure-receiving member moves rearward, it is possible to improve the rigidity of the load-receiving portion piece, without disturbing the deformation of the upper attachment portion of the attachment portion for attaching the load-receiving portion to the seat back frame.

Further, according to the conveyance seat of the present invention, since the protruding amount of the reinforcement portion is larger than the depth of the groove-shaped concave portion, the reinforcing effect due to the reinforcement portion can be more effectively exhibited.

Further, according to the conveyance seat of the present invention, since the length of the reinforcement portion in the seat width direction is longer than the length of the second load-receiving portion piece, the reinforcing effect due to the reinforcement portion is more effectively exhibited.

Further, according to the conveyance seat of the present invention, since the reinforcement portion is accommodated in the groove-shaped concave portion, it is possible to further downsize the pressure-receiving member.

Further, according to the conveyance seat of the present invention, since the reinforcement portion is completely accommodated in the groove-shaped concave portion, it is possible to further downsize the pressure-receiving member.

Further, according to the conveyance seat of the present invention, the support performance of the load-receiving portion is improved with respect to the vertical extending portion of the attachment portion for attaching the load-receiving portion to the seat back frame. As a result, the load-receiving portion can be appropriately attached to the seat back frame.

Further, according to the conveyance seat of the present invention, it is possible to improve the rigidity of the load-receiving portion piece, without disturbing the bending of the both end portions of the load-receiving portion piece.

Further, according to the conveyance seat of the present invention, since the position at which the reinforcement portion is disposed in each load-receiving portion piece is aligned between the load-receiving portion pieces, it is possible to further improve the seat feeling that the occupant feels when seated on the seat.

Further, according to the conveyance seat of the present invention, the rigidity of the portion provided at the same position in the load-receiving portion as the connecting portion in the seat width direction is improved, and the load-receiving portion pieces are properly connected to each other.

Further, according to the conveyance seat of the present invention, the load-receiving portion equipped with the reinforcement portion has a simpler configuration.

DESCRIPTION OF THE PREFERRED EMBODIMENTS

<Configuration Example of Conveyance Seat of Present Invention>

Hereinafter, a configuration of a conveyance seat according to an embodiment (this embodiment) of the present invention will be described with reference to the drawings. However, the embodiments described below are for facilitating understanding of the present invention and do not limit the present invention. That is, the present invention can be changed or improved without departing from its gist. Also, equivalents of the present invention may of course be included in the present invention.

Hereinafter, as an example of the conveyance seat, a vehicle seat to be mounted on a vehicle such as an automobile will be cited, and a configuration example thereof will be described. However, the present invention can also be applied to a conveyance seat other than the vehicle seat, for example, a seat mounted on a ship or an aircraft.

In addition, in the following description, a "front to back direction" is a front to back direction of the vehicle seat, and is a direction coincident with a traveling direction at the time of traveling of the vehicle. Further, "a seat width direction" is a width direction of the vehicle seat, and is a direction coincident with a right and left direction viewed from the occupant seated on the vehicle seat. Further, "a vertical direction of the seat" is a direction from an upper end to a lower end of a seat back S1 to be described later, and a direction slightly inclined with respect to a height direction of the vehicle (a direction coincident with the vertical direction when the vehicle is traveling on a horizontal plane).

Further, in the following description, a "horizontal width" means a length in the seat width direction, and a "vertical width" means a length in the vertical direction of the seat.

Further, unless otherwise stated, shapes, positions, attitudes and the like of each portion of the seat to be described below will be described assuming a case in which the vehicle seat is in a normal use state (a state in which the vehicle seat is at a seatable position and each portion of the seat is at an initial position).

Figure 1:
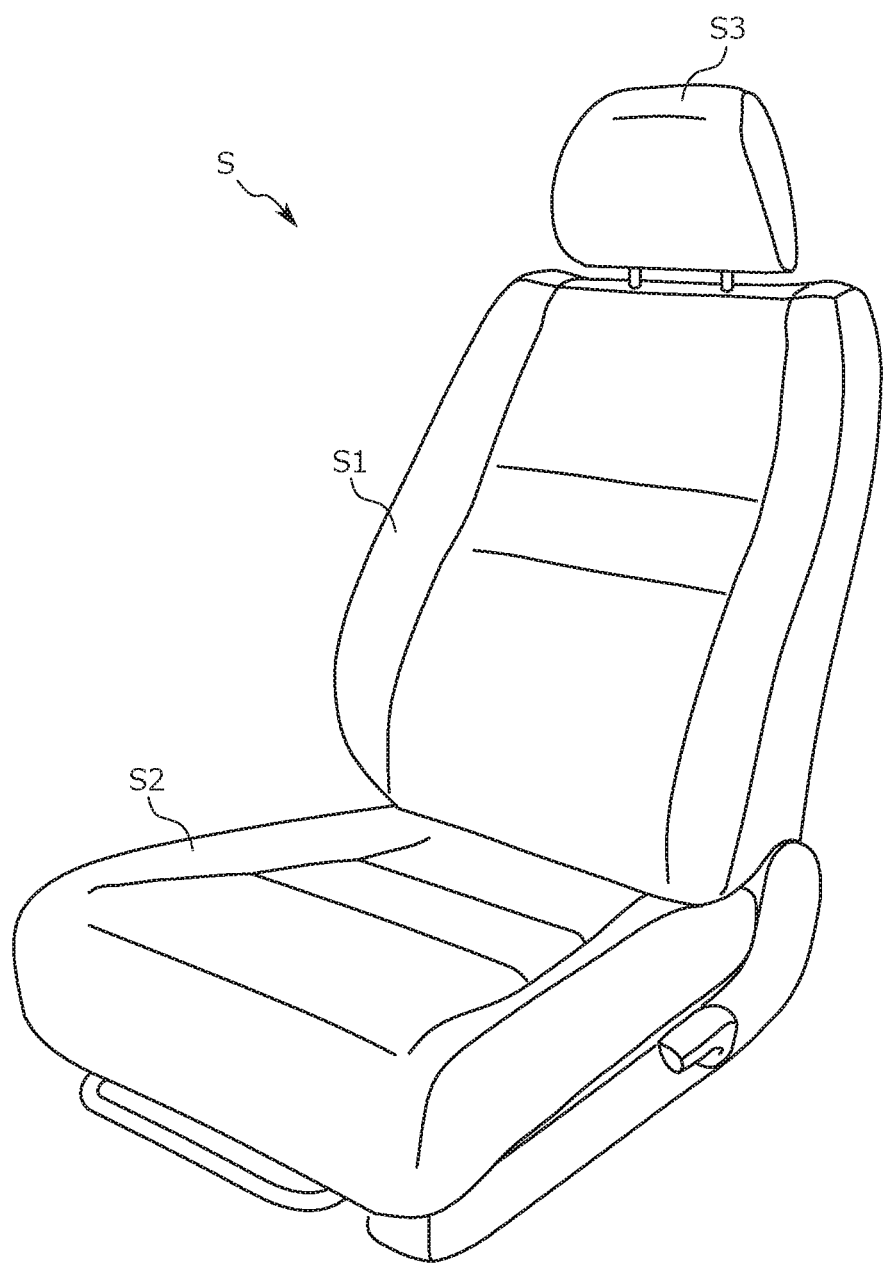
FIG. 1 is a perspective view of a conveyance seat according to an embodiment of the present invention.
Figure 2:
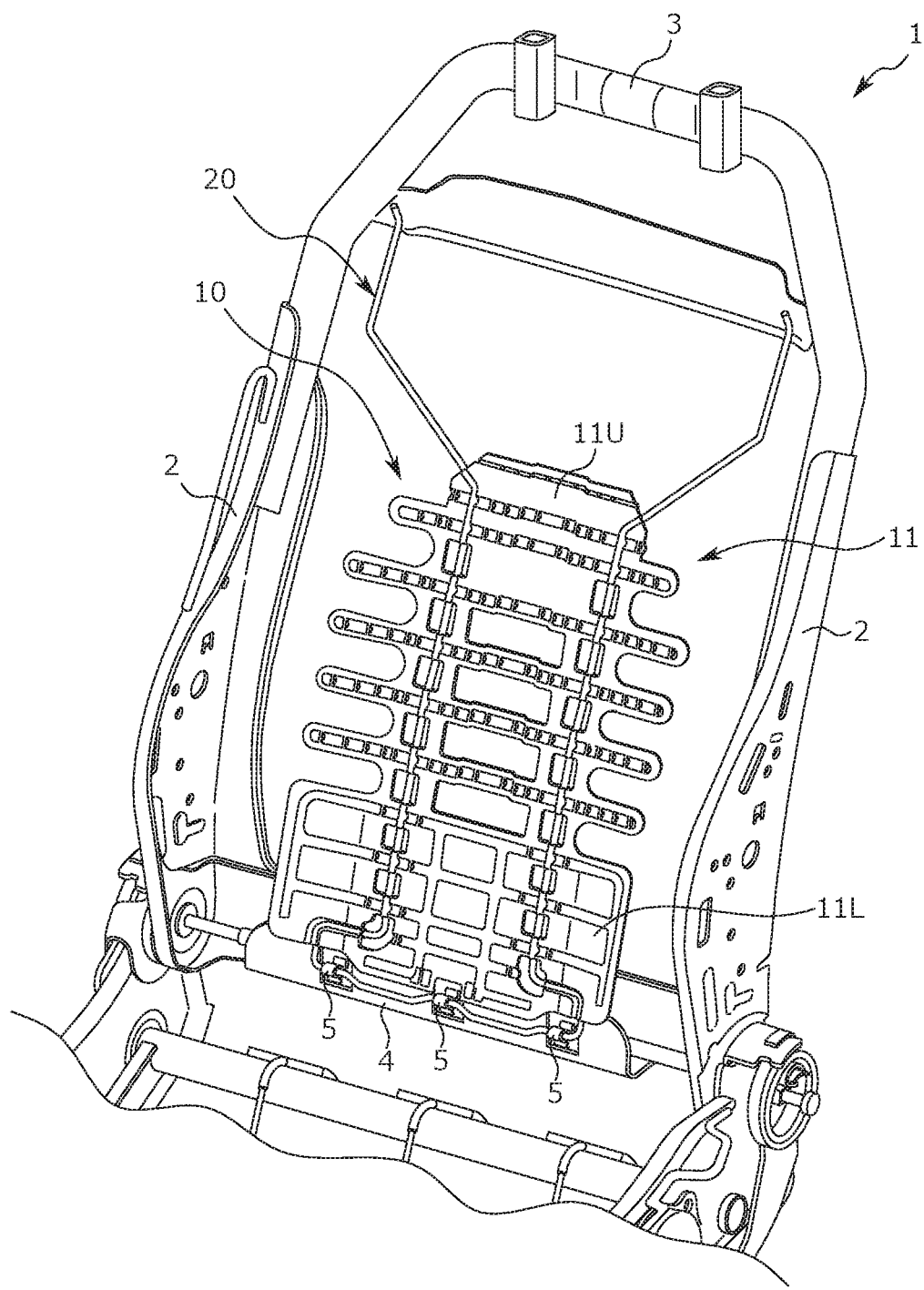
FIG. 2 is a view illustrating a seat frame of the conveyance seat according to an embodiment of the present invention.

First, a basic configuration of the vehicle seat (hereinafter, referred to as a vehicle seat S) according to the present embodiment will be described with reference to FIGS. 1 and 2. FIG. 1 is a perspective view of the vehicle seat S. FIG. 2 is a view illustrating a seat frame forming a framework of the vehicle seat S. In FIG. 2, the seat frame is illustrated in a simplified manner, and a partial configuration (for example, a groove-shaped concave portion 13, a reinforcement rib and the like to be described later) in a pressure-receiving member 10 is not illustrated.

The vehicle seat S has substantially the same configuration as a general vehicle seat except that it includes the pressure-receiving member 10 to be described later. More specifically, as illustrated in FIG. 1, the vehicle seat S includes the seat back S1 that supports the back of the occupant, a seat cushion S2 that supports the buttocks of the occupant, and a head rest S3 that supports the head of the occupant.

Further, the seat back S1 has a seat back frame 1 and a pressure-receiving member 10 therein. The seat back frame 1 forms the framework of the seat back S1. The seat back frame 1 forms a substantially rectangular frame when viewed from the front, and includes a side frame 2, an upper frame 3 and a lower member frame 4 as illustrated in FIG. 2. A pair of side frames 2 is provided at positions spaced apart from each other in the seat width direction. The upper frame 3 connects the upper end portions of the pair of right and left side frames 2 to each other. The lower member frame 4 is bridged between the lower end portions of the pair of right and left side frames 2.

A cushion pad (not illustrated) is disposed in front of the seat back frame 1 configured as described above, and a surface of the cushion pad is covered with a skin to constitute the seat back S1. Further, as illustrated in FIG. 2, the pressure-receiving member 10 is included inside the seat back S1. The pressure-receiving member 10 is a member that receives the load input from the back of the occupant, on a front face. Further, when a rear surface collision of a vehicle on which the vehicle seat S is mounted occurs and a load (an impact load) is input to the pressure-receiving member 10 from the back of the occupant, the pressure-receiving member 10 is pushed by the back of the occupant and moves (displaces) rearward together with the occupant. Due to such displacement of the pressure-receiving member 10, the load (the impact load) applied to a neck portion of the occupant at the time of a collision is reduced.

Figure 3:
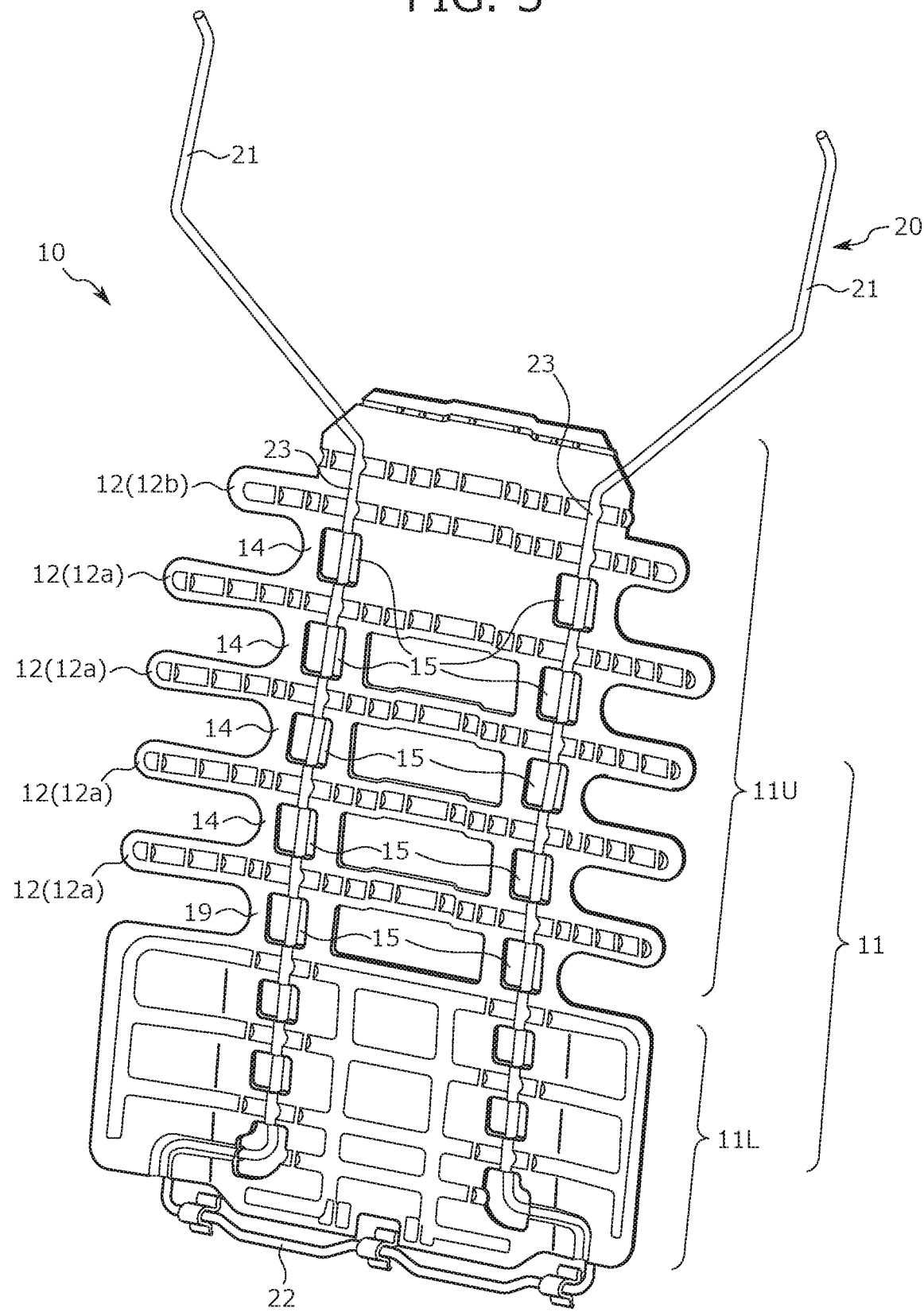
FIG. 3 is a view of a pressure-receiving member according to an embodiment of the present invention, as seen obliquely from the front.
Figure 4:
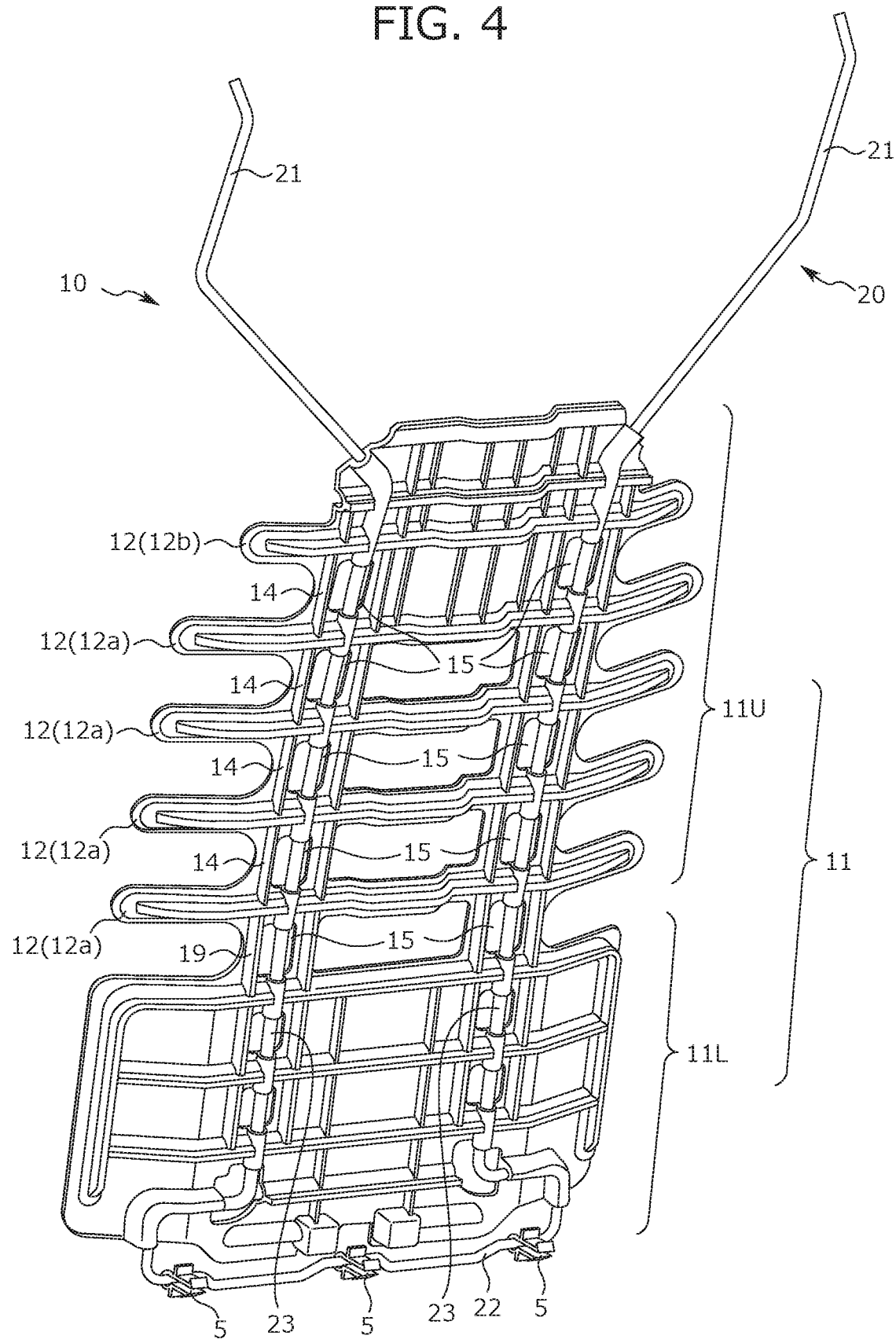
FIG. 4 is a view of the pressure-receiving member according to an embodiment of the present invention, as seen obliquely from the rear.
Figure 5:
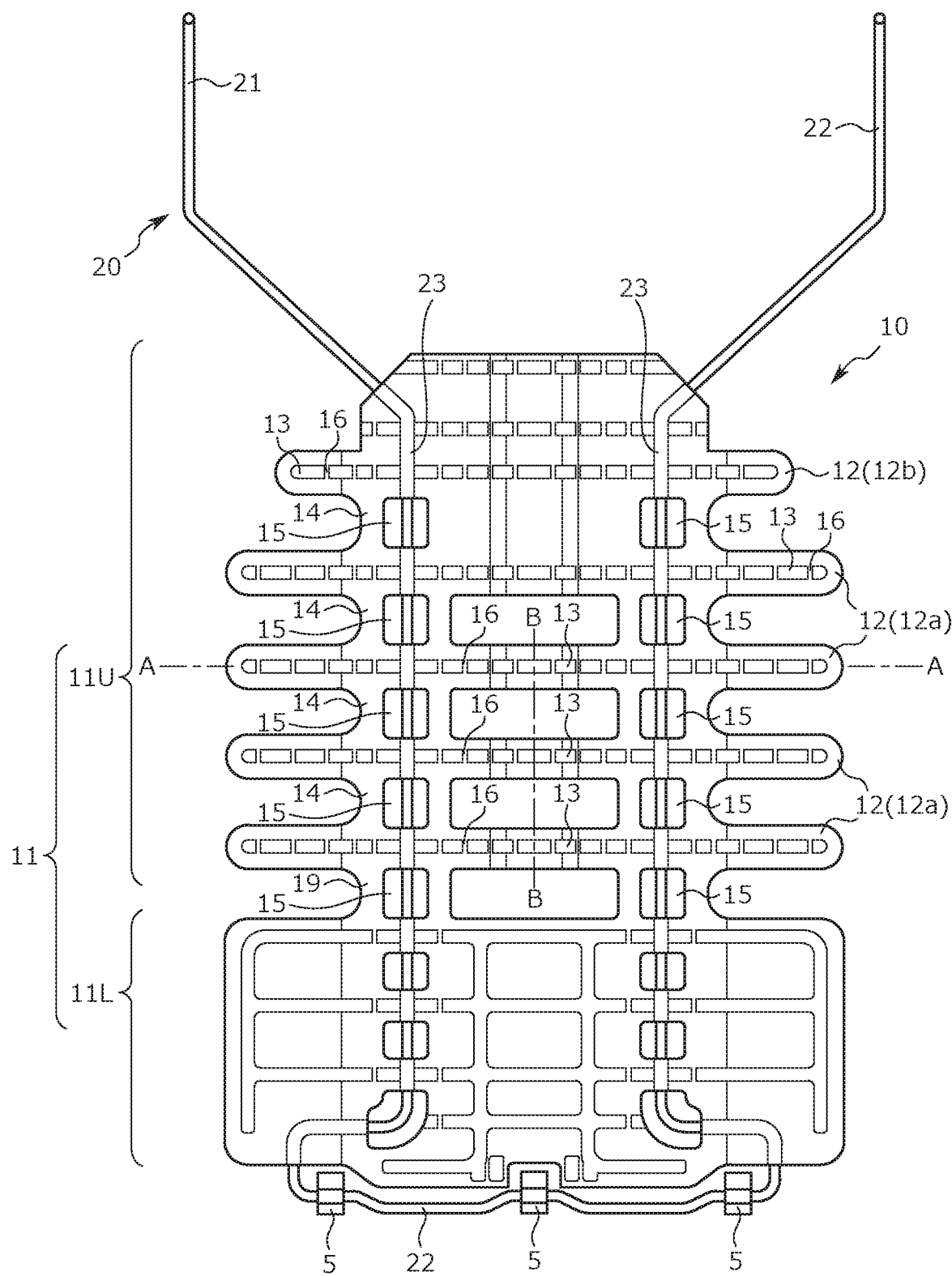
FIG. 5 is a front view of the pressure-receiving member according to an embodiment of the present invention.
Figure 6:
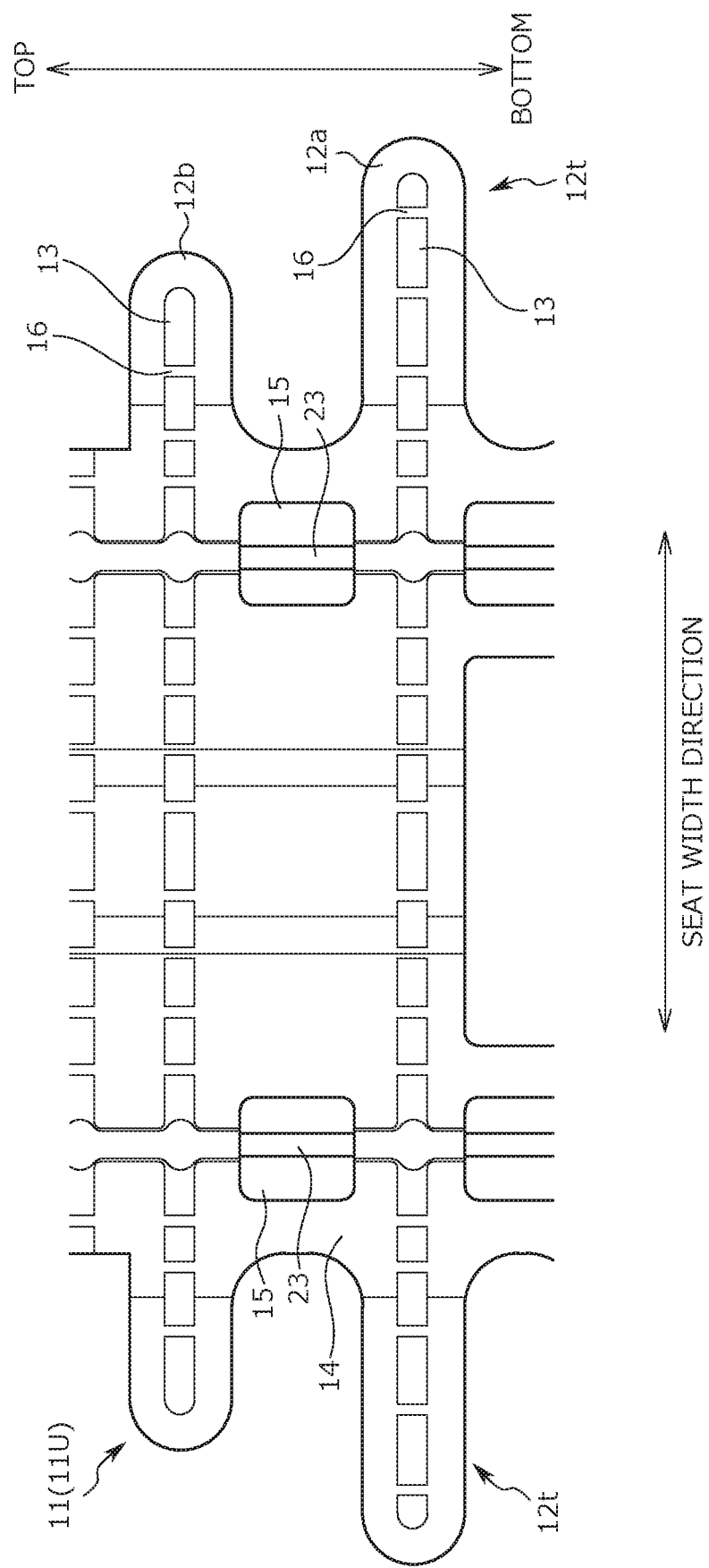
FIG. 6 is an enlarged view illustrating a first load-receiving portion piece and a second load-receiving portion piece of the load-receiving portion in the pressure-receiving member illustrated in FIG. 5.
Figure 7:
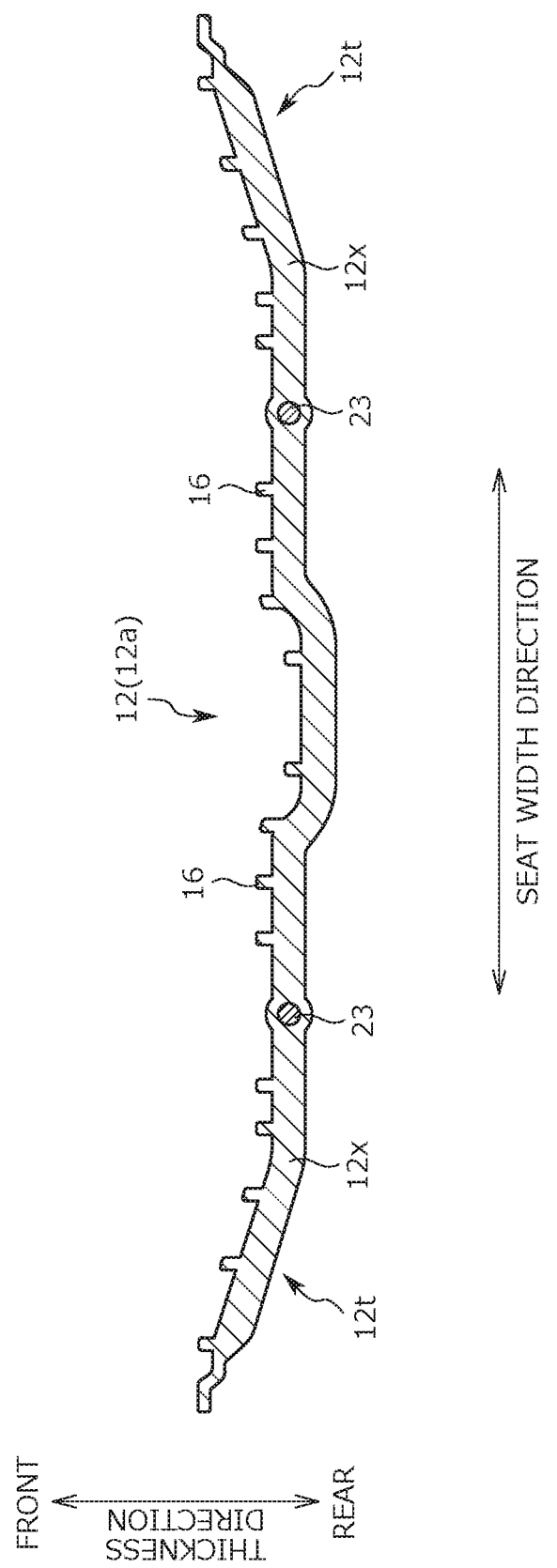
FIG. 7 is a cross-sectional view taken along a line A-A in FIG. 5.
Figure 8:
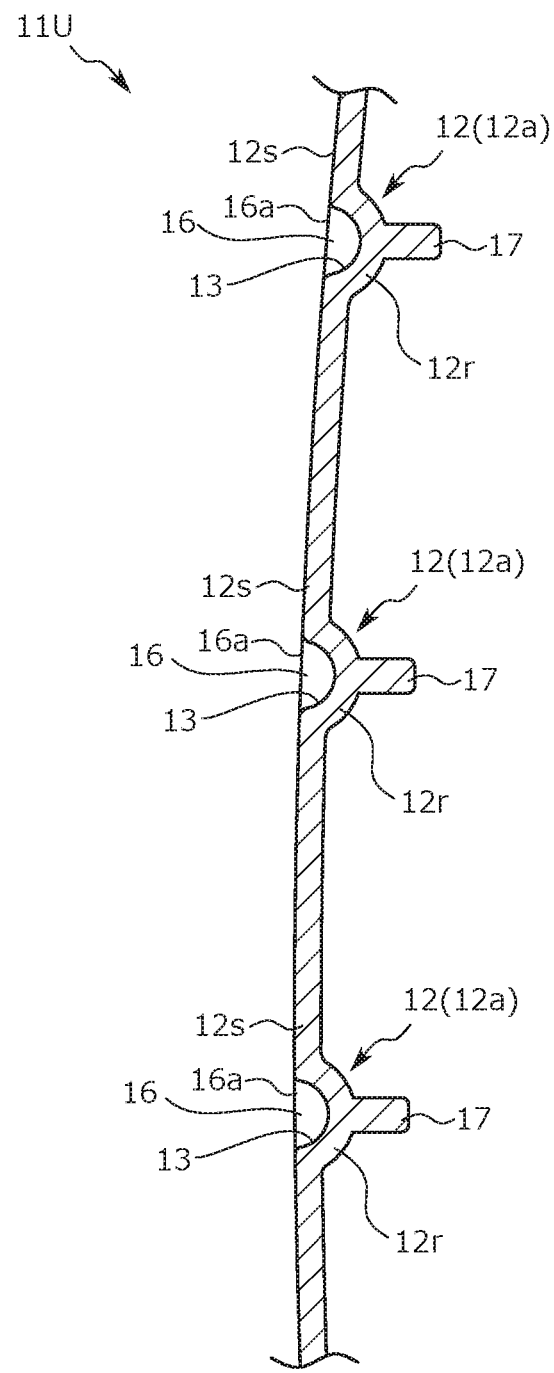
FIG. 8 is a view illustrating the pressure-receiving member taken along a B-B plane in FIG. 5.
Figure 9:
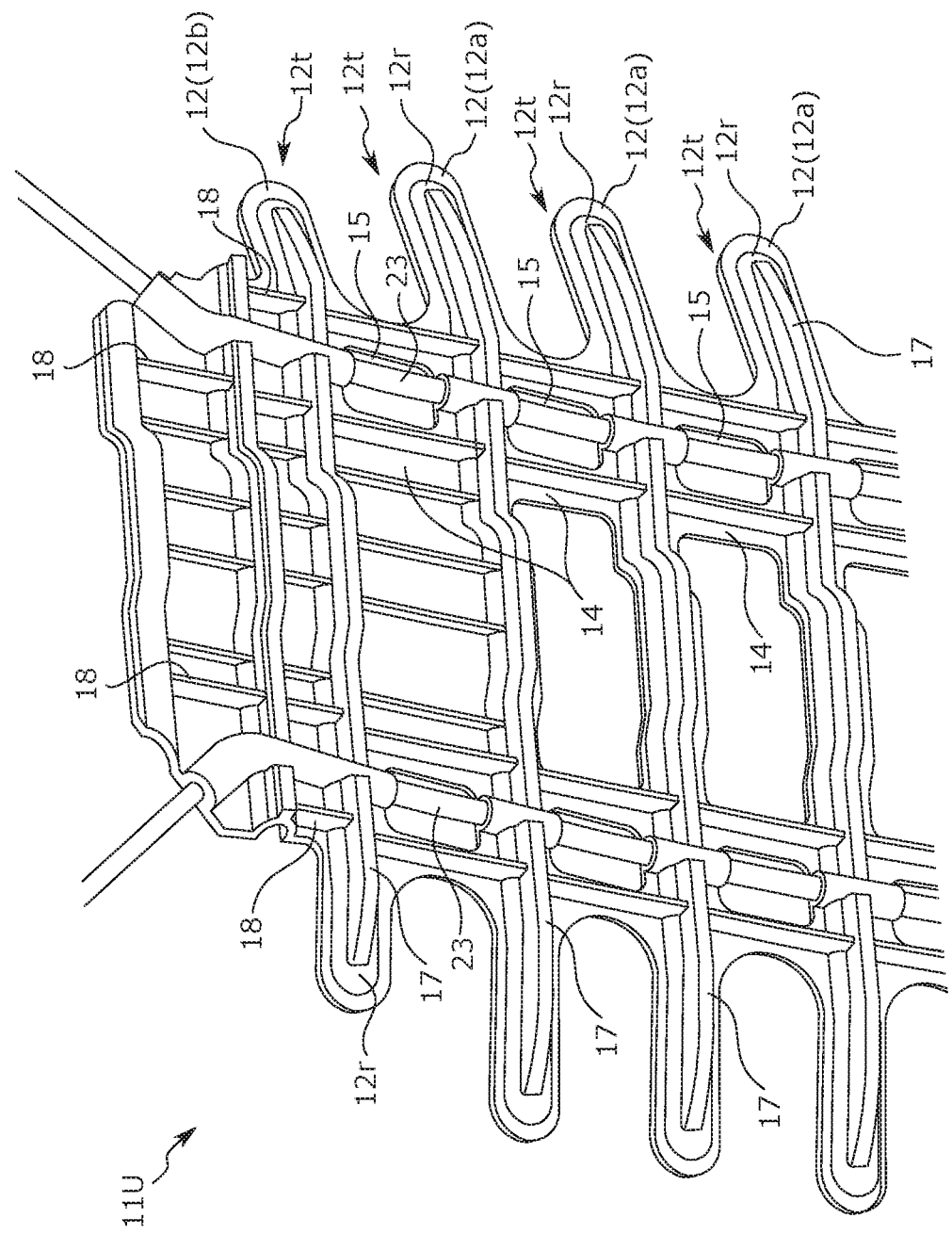
FIG. 9 is an enlarged view illustrating a first load-receiving portion piece and a second load-receiving portion piece of the load-receiving portion in the pressure-receiving member illustrated in FIG. 4.

Hereinafter, the configuration of the pressure-receiving member 10 will be described in detail with reference to FIG. 2 described above and FIGS. 3 to 9. FIGS. 3 to 5 are views illustrating an external appearance of the pressure-receiving member 10, FIG. 3 is a view of the pressure-receiving member 10 as seen obliquely from the front, FIG. 4 is a view of the pressure-receiving member 10 as seen obliquely from the rear, and FIG. 5 is a view of the pressure-receiving member 10 as seen from the front (a front side). FIG. 6 is an enlarged view of a portion of the pressure-receiving member 10 illustrated in FIG. 5 (specifically, a first load-receiving portion piece 12*a* and a second load-receiving portion piece 12*b* included in an upper receiving portion 11U to be described later). FIG. 7 is a cross-sectional view taken along the line A-A in FIG. 5. FIG. 8 is a view illustrating the pressure-receiving member 10 taken along a plane B-B in FIG. 5. FIG. 9 is an enlarged view of a portion of the pressure-receiving member 10 illustrated in FIG. 4 (specifically, the first load-receiving portion piece 12*a* and the second load-receiving portion piece 12*b* included in the upper receiving portion 11U to be described later).

As described above, the pressure-receiving member 10 is configured to be movable rearward in a state of receiving the load from the back of the occupant. Further, as illustrated in FIG. 2, the pressure-receiving member 10 is disposed behind the cushion pad forming the seat back S1. More specifically, the pressure-receiving member 10 is disposed in a rectangular space surrounded by the pair of right and left side frames 2, the upper frame 3 and the lower member frame 4.

The pressure-receiving member 10 is configured bisymmetrically with a center in the seat width direction as a boundary, and has a load-receiving portion 11 and an attachment wire 20 as illustrated in FIGS. 3 to 5. The load-receiving portion 11 is a portion which receives the load from the back of the occupant, and is configured by molding a resin plate (a plate-shaped member) into a shape illustrated in FIGS. 3, 4, and the like.

The attachment wire 20 functions as an attachment portion for attaching the load-receiving portion 11 to the seat back frame 1, is configured by bending a metallic wire into a predetermined shape, and is assembled to the load-receiving portion 11. In the present embodiment, the attachment wire 20 is formed integrally with the load-receiving portion 11 by insert molding. That is, a portion of the attachment wire 20 (mainly, a portion of a vertical extending portion 23 to be described later) is embedded in the resin plate forming the load-receiving portion 11.

Hereinafter, the configuration of each of the load-receiving portion 11 and the attachment wire 20 will be described.

<Configuration of Load-Receiving Portion>

As described above, the load-receiving portion 11 is formed of a resin plate. As illustrated in FIGS. 3 to 5, the load-receiving portion 11 of the present embodiment is divided into an upper portion (hereinafter, an upper receiving portion 11U) and a lower portion (hereinafter, a lower receiving portion 11L). As illustrated in FIG. 5, the lower receiving portion 11L is a portion forming a rectangular shape when viewed from the front, and mainly supports a portion corresponding to a waist of the occupant's back at the time of a vehicle rear collision.

As illustrated in FIG. 5, the upper receiving portion 11U is a portion imitating a rib shape of a human body, and supports a portion of the occupant's back corresponding to a thoracic vertebrae portion, at the time of the vehicle rear collision. A lower end portion of the upper receiving portion 11U is connected to an upper end portion of the lower receiving portion 11L via a coupling portion 19. Further, the coupling portion 19 has a shape in which its horizontal width is sufficiently shorter than the horizontal widths of the upper receiving portion 11U and the lower receiving portion 11L, and a plurality of (two in this embodiment) coupling portions 19 is provided at the positions spaced apart from each other in the seat width direction.

The configuration of the upper receiving portion 11U will be described. The upper receiving portion 11U has a load-receiving portion piece 12 which is an elongated portion long in the seat width direction. The load-receiving portion piece 12 is formed such that its vertical width is sufficiently shorter than its horizontal width, and the load-receiving portion piece 12 is formed in an oblong shape in this embodiment as illustrated in FIG. 5. A plurality of (five in the present embodiment) load-receiving portion pieces 12 is provided in the upper receiving portion 11U at intervals in the vertical direction of the seat. Further, the shape and the number of the load-receiving portion pieces 12 are not limited to the aforementioned contents, and can be freely designed as long as the load-receiving portion 11 can satisfactorily exhibit its function.

Among the plurality of load-receiving portion pieces 12, the load-receiving portion piece 12 located at the uppermost position is different from the other load-receiving portion pieces 12 in the shape. More specifically, the load-receiving portion pieces 12 other than the load-receiving portion piece 12 located at the uppermost position correspond to the first load-receiving portion piece 12a. The horizontal width of each first load-receiving portion piece 12a is uniform between the first load-receiving portion pieces 12a. On the other hand, the load-receiving portion piece 12 located at the uppermost position corresponds to the second load-receiving portion piece 12b. As illustrated in FIGS. 5 and 6, the horizontal width of the second load-receiving portion piece 12b is shorter than the horizontal width of the first load-receiving portion piece 12a.

As illustrated in FIG. 5, a portion of the upper receiving portion 11U located above the second load-receiving portion piece 12b (hereinafter, an upper end portion of the upper receiving portion 11U) has a substantially trapezoidal shape as viewed from the front, and its horizontal width is slightly shorter than the horizontal width of the second load-receiving portion piece 12b.

In addition, each of the plurality of load-receiving portion pieces 12 is slightly bent with respect to the seat width direction to favorably support the back of the occupant. Specifically, as illustrated in FIG. 7, each of the both end portions of the load-receiving portion piece 12 in the seat width direction (hereinafter, a seat width direction end portion 12t) is bent such that a portion of the seat width direction end portion 12t located on the outer side in the seat width direction is located in front of the portion located on the inner side in the seat width direction. That is, a bent portion 12x exists at the seat width direction end portions 12t of each load-receiving portion piece 12.

Further, as illustrated in FIGS. 5 and 6, a groove-shaped concave portion 13 formed long along the seat width direction is formed in each of the plurality of load-receiving portion pieces 12. The groove-shaped concave portion 13 is formed by recessing a central portion in the vertical direction of the seat on the front face of the load-receiving portion piece 12 rearward. In other words, the central portion in the vertical direction of the seat on the rear face of the load-receiving portion piece 12 is raised along with the formation of the groove-shaped concave portion 13 to form a raised portion 12r. Further, the raised portion 12r is raised in a substantially arc shape in a side view as illustrated in FIG. 8.

The groove-shaped concave portion 13 is continuously formed from one end portion to the other end portion of the load-receiving portion piece 12 in the seat width direction. An opening of the groove-shaped concave portion 13 is provided on the front face of the load-receiving portion piece 12, and has an oval shape as illustrated in FIG. 6. Further, in the present embodiment, a horizontal width of the opening of the groove-shaped concave portion 13 is slightly smaller than the horizontal width of the load-receiving portion piece 12 in which the groove-shaped concave portion 13 is formed, and a vertical width of the opening of the groove-shaped concave portion 13 is about half of the vertical width of the load-receiving portion piece 12 in which the groove-shaped concave portion 13 is formed.

Further, the sizes (the horizontal width and the vertical width) of the groove-shaped concave portion 13 formed in the first load-receiving portion piece 12a are uniform between the first load-receiving portion pieces 12a. On the other hand, the horizontal width of the groove-shaped concave portion 13 formed in the second load-receiving portion piece 12b is slightly shorter than the horizontal width of the groove-shaped concave portion 13 formed in the first load-receiving portion piece 12a.

Further, the groove-shaped concave portion 13 is also provided in the portion of the load-receiving portion 11 located immediately above the second load-receiving portion piece 12b, that is, the upper end portion of the load-receiving portion 11. The groove-shaped concave portion 13 provided at the upper end portion of the load-receiving portion 11 extends from one end to the other end of the upper end portion in the seat width direction.

Further, the load-receiving portion 11 includes three types of reinforcement ribs formed to increase the rigidity of the load-receiving portion 11. Specifically, as illustrated in FIGS. 5 and 6, reinforcement ribs (hereinafter, referred to as "front reinforcement ribs 16") protruding forward from the load-receiving portion piece 12 along the thickness direction of the load-receiving portion 11 are provided on the front face of the load-receiving portion 11. Further, as illustrated in FIG. 9, reinforcement ribs (hereinafter, referred to as "rear reinforcement ribs 17") protruding rearward from the load-receiving portion piece 12 along the thickness direction of the load-receiving portion 11 are provided on the rear face of the load-receiving portion 11. Further, reinforcement ribs (hereinafter, referred to as "intersecting reinforcement ribs 18") intersecting the rear reinforcement ribs 17 are provided on the rear face of the load-receiving portion 11.

As described above, in the present embodiment, the front reinforcement rib 16, the rear reinforcement rib 17, and the intersecting reinforcement rib 18 are provided in each load-receiving portion piece 12. Therefore, by providing the load-receiving portion piece 12, it is possible to ensure the flexibility of the load-receiving portion 11 (strictly, the flexibility at the load-receiving portion piece 12) and to ensure the rigidity of the load-receiving portion piece 12.

Each reinforcement rib will be described in detail later.

Further, the load-receiving portion 11 has a connecting portion 14 disposed between the load-receiving portion pieces 12 in the vertical direction of the seat. The connecting portion 14 is a portion that connects between the load-receiving portion pieces 12 in the vertical direction of the seat. Among the connecting portions 14, the connecting portion 14 for connecting the first load-receiving portion pieces 12a to each other has a rectangular shape having a relatively short horizontal width, and in the present embodiment, as illustrated in FIG. 5, each pair of connecting portions 14 is provided at the positions spaced apart from each other in the seat width direction. In contrast, the connecting portion 14 for connecting the first load-receiving portion piece 12a and the second load-receiving portion piece 12b has a belt shape having a relatively wide horizontal width, and is provided to connect the central portions in the seat width direction of each of the first load-receiving portion piece 12a and the second load-receiving portion piece 12b.

Further, a plurality of connecting portions 14 for connecting the first load-receiving portion pieces 12a to each other is provided depending on the number of gaps between the first load-receiving portion pieces 12a. Each of the plurality of connecting portions 14 (the connecting portions 14 for connecting the first load-receiving portion pieces 12a to each other) is disposed at the same position in the seat width direction, and is aligned on a straight line as illustrated in FIG. 5.

In addition, the load-receiving portion 11 is provided with a penetration hole 15 formed to reduce the weight of the load-receiving portion 11. The penetration hole 15 is a hole that passes through the load-receiving portion 11 in the thickness direction of the load-receiving portion 11 and has a substantially rectangular shape in a front view. In this embodiment, the penetration hole 15 is provided at a position deviated from the load-receiving portion piece 12 in the vertical direction of the seat, specifically, the penetration hole 15 is provided in the connecting portion 14 as illustrated in FIGS. 5 and 6. More specifically, the penetration hole 15 is formed in each of a pair of right and left connecting portions 14 for connecting the first load-receiving portion pieces 12a to each other. In addition, a plurality (two in the present embodiment) of penetration holes 15 is provided in the connection portion 14 for connecting the first load-receiving portion piece 12a and the second load-receiving portion piece 12b at mutually different positions in the seat width direction.

Further, in the present embodiment, as illustrated in FIG. 5, the formation positions of the penetration holes 15 in the seat width direction are aligned between the load-receiving portion pieces 12. More specifically, the penetration hole 15 provided in the connecting portion 14 on the left side (one end side in the seat width direction) of the pair of right and left connecting portions 14 for connecting the first load-receiving portion pieces 12a to each other is formed at the same position as the penetration hole 15 on the left side (one end side in the seat width direction) of the pair of right and left penetration holes 15 formed in the connecting portion 14 for connecting the first load-receiving portion piece 12a and the second load-receiving portion piece 12b, in the seat width direction. Similarly, the penetration hole 15 provided in the connecting portion 14 on the right side (the other end side in the seat width direction) of the pair of right and left connecting portions 14 for connecting the first load-receiving portion pieces 12a to each other is formed at the same position as the penetration hole 15 on the right side (the other end side in the seat width direction) of the pair of right and left pair of penetration holes 15 formed in the connecting portion 14 for connecting the first load-receiving portion piece 12a and the second load-receiving portion piece 12b, in the seat width direction.

Next, the aforementioned various reinforcement ribs will be described in detail.

The front reinforcement rib 16 is a reinforcement portion formed on the front face of the load-receiving portion piece 12 and extends along the vertical direction of the seat as illustrated in FIG. 6. In the present embodiment, the front reinforcement rib 16 is made of the same material as that of the portion of the resin plate forming the load-receiving portion 11 other than the front reinforcement rib 16, and is formed so as to be integrated with a portion other than the front reinforcement rib 16. In other words, the front reinforcement rib 16 is integrally formed together with other portions (the portions other than the front reinforcement rib 16) when molding the resin plate forming the load-receiving portion 11.

A plurality of front reinforcement ribs 16 is provided on each of the plurality of load-receiving portion pieces 12, specifically, the plurality of front reinforcement ribs 16 is disposed so as to be aligned along the seat width direction. More specifically, the plurality of front reinforcement ribs 16 is provided at intervals to form rows from one end portion to the other end portion of the load-receiving portion piece 12 in the seat width direction. Further, in the present embodiment, the front reinforcement ribs 16 are disposed so as to be symmetrical with the center of the load-receiving portion 11 in the seat width direction as a boundary. Further, the number of front reinforcement ribs 16 is not particularly limited, and can be set to an arbitrary number (however, it is preferable to be at least 2 or more).

In addition, as illustrated in FIG. 5, the formation position of each of the plurality of front reinforcement ribs 16 provided on each load-receiving portion piece 12 is aligned between the load-receiving portion pieces 12. More specifically, among the two load-receiving portion pieces 12 that are adjacent to each other in the vertical direction of the seat, each of the plurality of front reinforcement ribs 16 provided on one load-receiving portion piece 12 (for easy understanding, an upper side), and each of the plurality of front reinforcement ribs 16 provided on the other load-receiving portion piece 12 (for easy understanding, a lower side) are disposed to be aligned at the same position in the seat width direction. In other words, among the plurality of front reinforcement ribs 16 provided on each load-receiving portion piece 12, the front reinforcement ribs 16 disposed at the predetermined position in the seat width direction are disposed to be aligned on a straight line at the predetermined position.

Further, each of the number of front reinforcement ribs 16 provided on each of the first load-receiving portion piece 12a is equal. Furthermore, the number of front reinforcement ribs 16 provided on the first load-receiving portion piece 12a is larger than the number of front reinforcement ribs 16 provided on the second load-receiving portion piece 12b. Here, among the front reinforcement ribs 16 provided on the first load-receiving portion piece 12a, the front reinforcement ribs 16 disposed at the end portion in the seat width direction are located outside the second load-receiving portion piece 12b in the seat width direction. That is, in the present embodiment, the front reinforcement ribs 16 are disposed outside the second load-receiving portion piece 12b in the seat width direction.

Further, as illustrated in FIGS. 5, 6, and 8, the front reinforcement ribs 16 are disposed in the groove-shaped concave portion 13. In other words, the front reinforcement ribs 16 provided on each load-receiving portion piece 12 are accommodated in the groove-shaped concave portions 13 formed in each load-receiving portion piece 12. Further, as illustrated in FIG. 8, a surface 12s located at the opening peripheral edge of the groove-shaped concave portion 13 in the load-receiving portion piece 12, and an end (that is, a tip 16a) of the front reinforcement rib 16 in the protruding direction of the front reinforcement rib 16 are at the same position in the thickness direction of the load-receiving portion 11. In other words, in the present embodiment, the surface 12s located at the opening peripheral edge and the surface of the tip 16a of the front reinforcement rib 16 are on the same plane, and the front reinforcement rib 16 is completely accommodated in the groove-shaped concave portion 13.

Further, as illustrated in FIG. 5, the front reinforcement ribs 16 are also provided in the groove-shaped concave portion 13 provided at the upper end portion of the load-receiving portion 11, that is, the groove-shaped concave portion 13 provided at the position immediately above the second load-receiving portion piece 12b.

The rear reinforcement rib 17 is a reinforcement portion formed on the rear face of the load-receiving portion piece 12, and extends linearly along the seat width direction as illustrated in FIG. 9. In the present embodiment, the rear reinforcement rib 17 is integrally formed together with other portions (portions other than the rear reinforcement rib 17) when molding the resin plate forming the load-receiving portion 11.

One rear reinforcement rib 17 is provided for each of the plurality of load-receiving portion pieces 12, and specifically, as illustrated in FIG. 8, the rear reinforcement rib 17 is provided at the central portion of each load-receiving portion piece 12 in the vertical direction of the seat. More strictly, the rear reinforcement rib 17 is provided in a portion raised most rearward, in the raised portion 12r (in other words, the portion in which the groove-shaped concave portion 13 is provided) formed on the rear face of each load-receiving portion piece 12.

Further, in the present embodiment, the rear reinforcement rib 17 protrudes to be longer than the depth of the groove-shaped concave portion 13 (the length in the thickness direction of the load-receiving portion 11). That is, in the present embodiment, a protruding amount of the rear reinforcement rib 17 is larger than a depth of the groove-shaped concave portion 13.

Further, as illustrated in FIG. 9, the rear reinforcement rib 17 continuously extends from one end portion to the other end portion in the seat width direction of the raised portion 12r (in other words, the portion in which the groove-shaped concave portion 13 is provided).

The intersecting reinforcement ribs 18 are formed on the rear face of the load-receiving portion 11 and extend linearly along the vertical direction of the seat. In the present embodiment, the intersecting reinforcement ribs 18 are integrally molded together with other portions (portions other than the intersecting reinforcement ribs 18) when molding the resin plate forming the load-receiving portion 11.

The intersecting reinforcement rib 18 corresponds to the intersecting reinforcement portion, and is disposed at a position different from the rear reinforcement rib 17 on the rear face of the load-receiving portion 11. Specifically, as illustrated in FIG. 9, the intersecting reinforcement rib 18 is disposed in a portion adjacent to the connecting portion 14 among the connecting portion 14 and each load-receiving portion piece 12. The intersecting reinforcement rib 18 provided at such a position intersects (strictly, substantially orthogonal to) the rear reinforcement rib 17. Further, in the present embodiment, the intersecting reinforcement ribs 18 extend sufficiently long along the vertical direction of the seat and intersect all the rear reinforcement ribs 17 provided on each of the plurality of load-receiving portion pieces 12.

Further, in this embodiment, as illustrated in FIG. 9, a plurality of intersecting reinforcement ribs 18 is formed. Specifically, two intersecting reinforcement ribs 18 are formed in a region on the rear face of the load-receiving portion 11 close to one end in the seat width direction, and two intersecting reinforcement ribs 18 are formed in a region close to the other end in the seat width direction. Further, the number of the intersecting reinforcement ribs 18 is not particularly limited and can be set to an arbitrary number.

Further, in the present embodiment, the intersecting reinforcement ribs 18 protrude by a protruding amount shorter than the protruding amount of the rear reinforcement ribs 17. In other words, in the present embodiment, the protruding amount of the rear reinforcement ribs 17 is larger than the protruding amount of the intersecting reinforcement ribs 18.

<Configuration of Attachment Wire>

The attachment wire 20 is assembled to the load-receiving portion 11, and strictly, a portion thereof is inserted into the load-receiving portion 11. As illustrated in FIGS. 2 to 5, the attachment wire 20 has an upper attachment portion 21, a lower attachment portion 22, and a vertical extending portion 23.

The upper attachment portion 21 is a portion connected to the upper frame 3 (an upper portion) of the seat back frame 1, and is disposed above the load-receiving portion 11. Further, as illustrated in FIG. 5, a pair of upper attachment portions 21 is provided at positions spaced apart from each other in the seat width direction.

The lower attachment portion 22 is a portion connected to the lower member frame 4 (a lower portion) of the seat back frame 1, and is disposed below the load-receiving portion 11. The lower attachment portion 22 extends long in the seat width direction. Further, as illustrated in FIG. 5, an attachment clip 5 for attaching the pressure-receiving member 10 (strictly, the lower attachment portion 22 of the attachment wire 20) to the lower member frame 4 is mounted at an intermediate position of the lower attachment portion 22.

The vertical extending portion 23 is a portion which is located between the upper attachment portion 21 and the lower attachment portion 22 and extends in the vertical direction of the seat, and is assembled (inserted) to the load-receiving portion 11. Further, as illustrated in FIG. 5, a pair of the vertical extending portions 23 is provided at positions spaced apart from each other in the seat width direction.

Further, as illustrated in FIG. 5, the vertical extending portion 23 is provided to pass through the penetration hole 15 formed in the load-receiving portion 11. In other words, the vertical extending portion 23 is provided such that a range in which the penetration hole 15 is provided partially overlaps a range in which the vertical extending portion 23 is disposed, in the seat width direction. A portion of the vertical extending portion 23 passing through the penetration hole 15 is exposed through the penetration hole 15 as illustrated in FIG. 5. On the other hand, the portion of the vertical extending portion 23 that is inserted into the load-receiving portion 11 vertically crosses the load-receiving portion piece 12.

Further, the portion of the load-receiving portion 11, into which the vertical extending portion 23 is inserted, is located inside the seat width direction end portion 12t of the load-receiving portion piece 12 in the seat width direction, and more specifically, is located slightly inside the bent portion 12x existing in the seat width direction end portion 12t as illustrated in FIG. 7.

<Positional Relation Between Front Reinforcement Rib and Peripheral Devices>

Hereinafter, a positional relation between the front reinforcement rib 16 and its peripheral devices will be described with reference to FIGS. 5 to 7.

As illustrated in FIG. 5, the front reinforcement rib 16 is disposed at a position deviated from a position at which the upper attachment portion 21 of the attachment wire 20 is provided in the seat width direction. Specifically, each of the plurality of front reinforcement ribs 16 provided on each load-receiving portion piece 12 is located inside the upper attachment portion 21 in the seat width direction.

Further, as illustrated in FIG. 5, some of the plurality of front reinforcement ribs 16 provided on each load-receiving portion piece 12 are located within the range in which the lower attachment portion 22 of the attachment wire 20 is provided in the seat width direction. On the other hand, among the plurality of front reinforcement ribs 16, the front reinforcement rib 16 located at the outermost side in the seat width direction is located outside the lower attachment portion 22 in the seat width direction.

Further, as illustrated in FIGS. 5 and 6, the front reinforcement ribs 16 are disposed on both sides of the portion into which the vertical extending portion 23 is inserted, in each load-receiving portion piece 12. In other words, a plurality of front reinforcement ribs 16 is disposed so that the vertical extending portion 23 is located between the front reinforcement ribs 16 in the seat width direction. Further, as illustrated in FIGS. 5 and 6, the front reinforcement ribs 16 located on both sides of the vertical extending portion 23 are disposed so that the penetration holes 15 are located between the front reinforcement ribs 16 in the seat width direction. In other words, the front reinforcement ribs 16 are disposed at the position deviated from the range in which the penetration holes 15 are provided in the seat width direction.

Further, at least four or more front reinforcement ribs 16 are disposed in each load-receiving portion piece 12. Further, the interval between the front reinforcement ribs 16 varies depending on the position of the front reinforcement rib 16 in the seat width direction. A relation between the interval between the front reinforcement ribs 16 and the position of the front reinforcement rib 16 will be described while referring to FIG. 6. A gap between the front reinforcement ribs 16 located on both sides of the vertical extending portion 23 is the widest. On the other hand, a gap between the front reinforcement rib 16 at the side position of the vertical extending portion 23 and the front reinforcement rib 16 adjacent to the front reinforcement rib 16 at the side position of the vertical extending portion 23 on the opposite side to the vertical extending portion 23 is the narrowest. As illustrated in FIG. 6, the interval between the front reinforcement ribs 16 disposed at a position farther from the vertical extending portion 23 than the position becomes wider as going away from the vertical extending portion 23.

Further, as illustrated in FIG. 7, the front reinforcement ribs 16 provided on the respective load-receiving portion pieces 12 are disposed at the positions spaced apart from the bent portions 12x in the seat width direction end portion 12t of the load-receiving portion piece 12 in the seat width direction. Strictly speaking, the front reinforcement rib 16 located at the position closest to the bent portion 12x is disposed at a position slightly deviated from the bent portion 12x.

Further, as illustrated in FIG. 5, a plurality of front reinforcement ribs 16 is disposed within a range in which the connecting portion 14 is provided in the seat width direction (except for a range in which the penetration hole 15 is provided).

<Positional Relationship Between Rear Reinforcement Rib and Peripheral Devices>

Hereinafter, the positional relation between the rear reinforcement rib 17 and its peripheral devices will be described with reference to FIGS. 4 and 9.

As can be seen from FIGS. 4 and 9, the rear reinforcement rib 17 is disposed at a position deviated from the position at which the upper attachment portion 21 of the attachment wire 20 is provided in the seat width direction. More specifically, the rear reinforcement ribs 17 formed on the respective load-receiving portion pieces 12 are located between the pair of right and left upper attachment portions 21 in the seat width direction.

Further, as can be seen from FIGS. 4 and 9, the rear reinforcement ribs 17 are disposed to approach a position at which the lower attachment portion 22 of the attachment wire 20 is provided in the seat width direction. More specifically, the rear reinforcement rib 17 provided on the first load-receiving portion piece 12a is formed such that its horizontal width is longer than the horizontal width of the lower attachment portion 22. Further, in the seat width direction, the lower attachment portion 22 is disposed between both end positions of the rear reinforcement rib 17 provided on the first load-receiving portion piece 12a. Further, the rear reinforcement rib 17 provided on the second load-receiving portion piece 12b is formed such that its horizontal width is equal to the horizontal width of the lower attachment portion 22. Furthermore, the lower attachment portion 22 is disposed such that the position of the rear reinforcement rib 17 provided on the first load-receiving portion piece 12a and the position of the lower attachment portion 22 overlap each other in the seat width direction.

Further, as can be seen from FIGS. 4 and 9, the rear reinforcement ribs 17 provided on the first load-receiving portion piece 12a extend to the outside of the end position of the second load-receiving portion piece 12b in the seat width direction. That is, in this embodiment, each of the both ends in the seat width direction of the rear reinforcement rib 17 provided on the first load-receiving portion piece 12a is located outside the second load-receiving portion piece 12b in the seat width direction.

<Positional Relation Between Intersecting Reinforcement Rib and Peripheral Devices>

Hereinafter, a positional relation between the intersecting reinforcement rib 18 and its peripheral devices will be described with reference to FIG. 9.

As illustrated in FIG. 9, the intersecting reinforcement ribs 18 are disposed at both side positions of each of the pair of right and left vertical extending portions 23 provided in the attachment wire 20. That is, in the present embodiment, the intersecting reinforcement ribs 18 are disposed at positions sandwiching the respective vertical extending portions 23 in the seat width direction. Among the pair of intersecting reinforcement ribs 18 sandwiching the vertical extending portion 23, the intersecting reinforcement rib 18 located on the inner side in the seat width direction extends from the upper end portion of the load-receiving portion 11 as illustrated in FIG. 9, and the lower end thereof reaches the central portion (the central portion in the vertical direction of the seat) of the lower receiving portion 11L of the load-receiving portion 11.

REFERENCE SIGNS LIST

1 SEAT BACK FRAME
2 SIDE FRAME
3 UPPER FRAME
4 LOWER MEMBER FRAME
5 ATTACHMENT CLIP
10 PRESSURE-RECEIVING MEMBER
11 LOAD-RECEIVING PORTION
11U UPPER RECEIVING PORTION
11L LOWER RECEIVING PORTION
12 LOAD-RECEIVING PORTION PIECE
12a FIRST LOAD-RECEIVING PORTION PIECE
12b SECOND LOAD-RECEIVING PORTION PIECE
12r RAISED PORTION
12t SEAT WIDTH DIRECTION END PORTION
12s SURFACE LOCATED AT OPENING PERIPHERAL EDGE
12x BENT PORTION
13 GROOVE-SHAPED CONCAVE PORTION
14 CONNECTING PORTION
15 PENETRATION HOLE
16 FRONT REINFORCEMENT RIB (REINFORCEMENT PORTION)
16a TIP (END OF REINFORCEMENT PORTION)

17 REAR REINFORCEMENT RIB (REINFORCEMENT PORTION)
18 INTERSECTING REINFORCEMENT RIB (INTERSECTING REINFORCEMENT PORTION)
19 COUPLING PORTION
20 ATTACHMENT WIRE (ATTACHMENT PORTION)
21 UPPER ATTACHMENT PORTION
22 LOWER ATTACHMENT PORTION
23 VERTICAL EXTENDING PORTION
S AUTOMOBILE SEAT (VEHICLE SEAT)
S1 SEAT BACK
S2 SEAT CUSHION
S3 HEADREST

What is claimed is:

1. A conveyance seat comprising a seat back for supporting a back of an occupant, wherein
the seat back is provided with a pressure-receiving member capable of moving rearward in a state of receiving a load from the back of the occupant,
the pressure-receiving member has a load-receiving portion for receiving the load from the back of the occupant,
the load-receiving portion includes
a load-receiving portion piece formed so that a length in a vertical direction of the seat back is shorter than a length in a width direction of the conveyance seat, and
a reinforcement portion protruding from the load-receiving portion piece along a thickness direction of the load-receiving portion and extending along the vertical direction,
the load-receiving portion piece is provided with a groove-shaped concave portion formed by being recessed rearward, and
the reinforcement portion is located in the groove-shaped concave portion.

2. The conveyance seat according to claim 1, wherein
the reinforcement portion is a plurality of front reinforcement ribs disposed so as to be aligned along the width direction.

3. The conveyance seat according to claim 1, wherein
a surface of the load-receiving portion piece located at an opening peripheral edge of the groove-shaped concave portion, and an end of the reinforcement portion in a protruding direction of the reinforcement portion are located at the same position in the thickness direction.

4. The conveyance seat according to claim 1, wherein
a plurality of load-receiving portion pieces is provided at intervals in the vertical direction,
a plurality of reinforcement portions is disposed on each of the plurality of load-receiving portion pieces, and
each of the plurality of reinforcement portions provided on one load-receiving portion piece among the two load-receiving portion pieces adjacent to each other in the vertical direction, and each of the plurality of reinforcement portions provided on the other load-receiving portion piece are disposed so as to be aligned at the same position in the width direction.

5. The conveyance seat according to claim 1, wherein
the seat back includes a seat back frame,
the pressure-receiving member has an attachment portion for attaching the load-receiving portion to the seat back frame,
the attachment portion includes a lower attachment portion connected to a lower portion of the seat back frame, and
the reinforcement portion is disposed at a position at which the lower attachment portion is provided in the width direction.

6. The conveyance seat according to claim 1, wherein
a plurality of load-receiving portion pieces is provided at intervals in the vertical direction,
the load-receiving portion includes a connecting portion for connecting the load-receiving portion pieces in the vertical direction, and
the reinforcement portion is disposed at a position between both ends of the connecting portion in the width direction.

7. The conveyance seat according to claim 1, wherein
the load-receiving portion is constituted by a plate-shaped member, and
the reinforcement portion is made of the same material as a portion of the plate-shaped member other than the reinforcement portion, and is formed so as to be integrated with the portion other than the reinforcement portion.

8. A conveyance seat comprising a seat back for supporting a back of an occupant, wherein
the seat back is provided with a pressure-receiving member capable of moving rearward in a state of receiving a load from the back of the occupant,
the pressure-receiving member has a load-receiving portion for receiving the load from the back of the occupant,
the load-receiving portion includes
a load-receiving portion piece formed so that a length in a vertical direction of the seat back is shorter than a length in a width direction of the conveyance seat, and
a reinforcement portion protruding from the load-receiving portion piece along a thickness direction of the load-receiving portion and extending along the vertical direction, the seat back includes a seat back frame,
the pressure-receiving member has an attachment portion for attaching the load-receiving portion to the seat back frame,
the attachment portion has a vertical extending portion extending along the vertical direction, and
a plurality of reinforcement portions is disposed so that the vertical extending portion is located between the reinforcement portions in the width direction.

9. The conveyance seat according to claim 8, wherein
the reinforcement portion is a plurality of front reinforcement ribs disposed so as to be aligned along the width direction.

10. The conveyance seat according to claim 8, wherein
a plurality of load-receiving portion pieces is provided at intervals in the vertical direction,
a plurality of reinforcement portions is disposed on each of the plurality of load-receiving portion pieces, and
each of the plurality of reinforcement portions provided on one load-receiving portion piece among the two load-receiving portion pieces adjacent to each other in the vertical direction, and each of the plurality of reinforcement portions provided on the other load-receiving portion piece are disposed so as to be aligned at the same position in the width direction.

11. The conveyance seat according to claim 8, wherein
the seat back includes a seat back frame,
the pressure-receiving member has an attachment portion for attaching the load-receiving portion to the seat back frame, the attachment portion includes a lower attachment portion connected to a lower portion of the seat back frame, and the reinforcement portion is disposed at a position at which the lower attachment portion is provided in the width direction.

12. The conveyance seat according to claim 8, wherein a plurality of load-receiving portion pieces is provided at intervals in the vertical direction, the load-receiving portion includes a connecting portion for connecting the load-receiving portion pieces in the vertical direction, and the reinforcement portion is disposed at a position between both ends of the connecting portions in the width direction.

13. The conveyance seat according to claim 8, wherein the load-receiving portion is constituted by a plate-shaped member, and the reinforcement portion is made of the same material as a portion of the plate-shaped member other than the reinforcement portion, and is formed so as to be integrated with the portion other than the reinforcement portion.

14. A conveyance seat comprising a seat back for supporting a back of an occupant, wherein the seat back is provided with a pressure-receiving member capable of moving rearward in a state of receiving a load from the back of the occupant, the pressure-receiving member has a load-receiving portion for receiving the load from the back of the occupant, the load-receiving portion includes a load-receiving portion piece formed so that a length in a vertical direction of the seat back is shorter than a length in a width direction of the conveyance seat, and a reinforcement portion protruding from the load-receiving portion piece along a thickness direction of the load-receiving portion and extending along the vertical direction, each of both end portions of the load-receiving portion piece in the width direction is bent such that a portion of each both end portion located outside in the width direction is located forward of a portion located inside, and the reinforcement portion is disposed at a position apart from each bent portion of both end portions of the load-receiving portion piece in the width direction.

15. The conveyance seat according to claim 14, wherein the reinforcement portion is a plurality of front reinforcement ribs disposed so as to be aligned along the width direction.

16. The conveyance seat according to claim 14, wherein a plurality of load-receiving portion pieces is provided at intervals in the vertical direction, a plurality of reinforcement portions is disposed on each of the plurality of load-receiving portion pieces, and each of the plurality of reinforcement portions provided on one load-receiving portion piece among the two load-receiving portion pieces adjacent to each other in the vertical direction, and each of the plurality of reinforcement portions provided on the other load-receiving portion piece are disposed so as to be aligned at the same position in the width direction.

17. The conveyance seat according to claim 14, wherein the seat back includes a seat back frame, the pressure-receiving member has an attachment portion for attaching the load-receiving portion to the seat back frame, the attachment portion includes a lower attachment portion connected to a lower portion of the seat back frame, and the reinforcement portion is disposed at a position at which the lower attachment portion is provided in the width direction.

18. The conveyance seat according to claim 14, wherein a plurality of load-receiving portion pieces is provided at intervals in the vertical direction, the load-receiving portion includes a connecting portion for connecting the load-receiving portion pieces in the vertical direction, and the reinforcement portion is disposed at a position between both ends of the connecting portions in the width direction.

19. The conveyance seat according to claim 14, wherein the load-receiving portion is constituted by a plate-shaped member, and the reinforcement portion is made of the same material as a portion of the plate-shaped member other than the reinforcement portion, and is formed so as to be integrated with the portion other than the reinforcement portion.

* * * * *